(12) United States Patent
Uzawa et al.

(10) Patent No.: US 7,085,064 B2
(45) Date of Patent: Aug. 1, 2006

(54) OBJECT LENS AND ENDOSCOPE USING IT

(75) Inventors: Tsutomu Uzawa, Hidaka (JP); Ken Kasai, Hachioji (JP); Takayuki Kato, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/513,120

(22) PCT Filed: May 14, 2004

(86) PCT No.: PCT/JP2004/006533

§ 371 (c)(1),
(2), (4) Date: Nov. 1, 2004

(87) PCT Pub. No.: WO2004/102247

PCT Pub. Date: Nov. 25, 2004

(65) Prior Publication Data

US 2005/0225872 A1    Oct. 13, 2005

(30) Foreign Application Priority Data

May 15, 2003  (JP) .............................. 2003-137263

(51) Int. Cl.
*G02B 21/02* (2006.01)
(52) U.S. Cl. .................. 359/661; 359/660; 359/740
(58) Field of Classification Search ......... 359/656–661
See application file for complete search history.

(56) References Cited

U.S. PATENT DOCUMENTS

| 5,223,982 | A | 6/1993 | Suzuki et al. ............... 359/716 |
| 5,436,767 | A | 7/1995 | Suzuki et al. |
| 5,805,359 | A | 9/1998 | Yamanashi |
| 5,923,479 | A | 7/1999 | Nagata |
| 6,118,590 | A * | 9/2000 | Chiba ......................... 359/642 |
| 6,236,521 | B1 * | 5/2001 | Nanba ........................ 359/715 |
| 6,327,101 | B1 * | 12/2001 | Miyano ...................... 359/691 |

FOREIGN PATENT DOCUMENTS

| JP | 02-176611 | 7/1990 |
| JP | 05-297272 | 11/1993 |
| JP | 09-061710 | 3/1997 |
| JP | 10-170821 | 6/1998 |
| JP | 2004-145256 | 5/2004 |

* cited by examiner

*Primary Examiner*—Jordan M. Schwartz
(74) *Attorney, Agent, or Firm*—Kenyon & Kenyon LLP

(57) ABSTRACT

An objective lens includes, in order from the object side, a first lens (L1) with negative power, a second lens (L2) with positive power, an aperture stop (AS), and a third lens (L3) with positive power. A lens component located on the image side of the aperture stop (AS) is constructed with a positive single lens or a plurality of positive single lenses, and the objective lens satisfies the following conditions:

$$45 < vd1 - vd2$$

$$-0.6 < f1/f2 < -0.3$$

where vd1 is the Abbe's number of the first lens, vd2 is the Abbe's number of the second lens, f1 is the focal length of the first lens, and f2 is the focal length of the second lens.

19 Claims, 7 Drawing Sheets

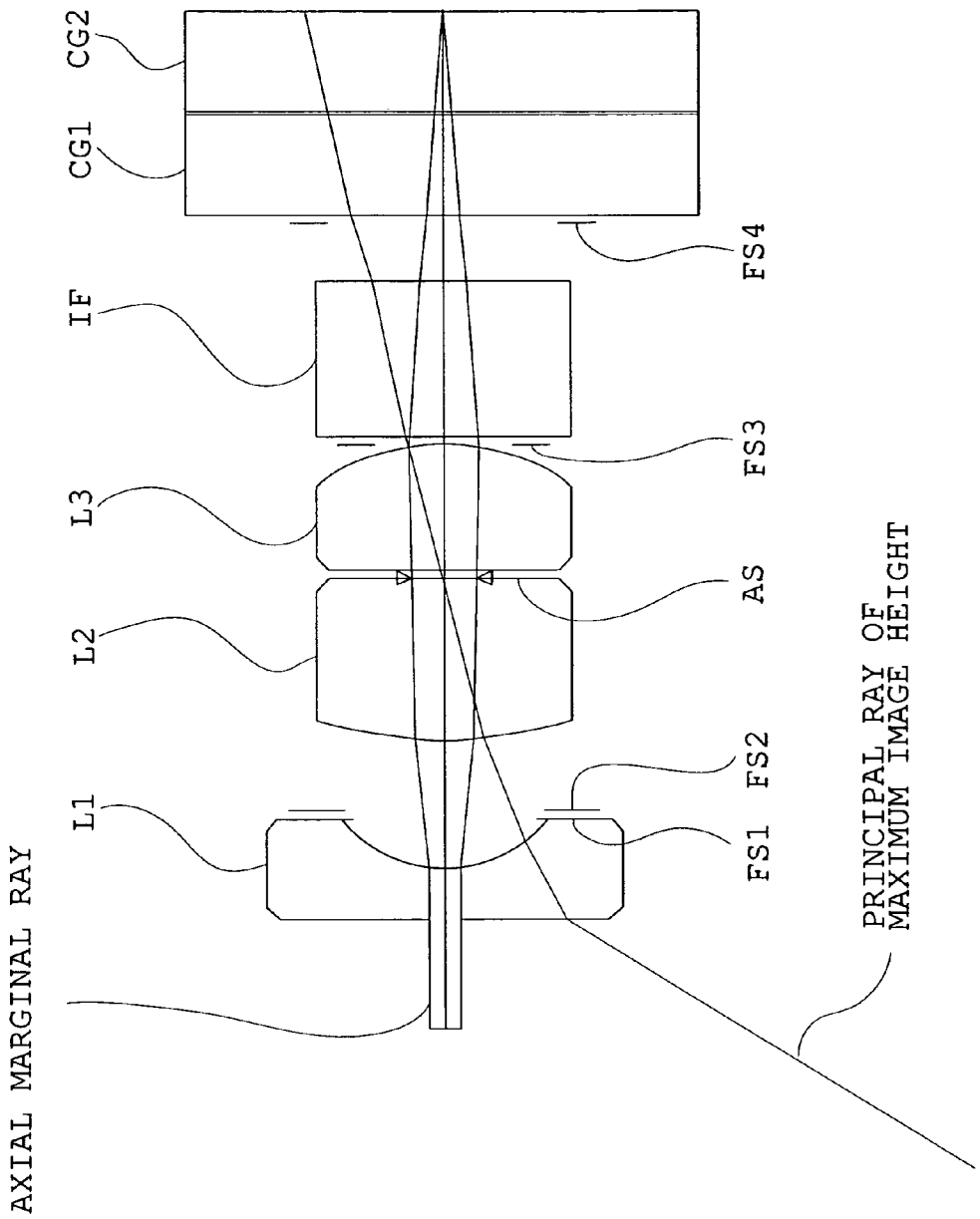

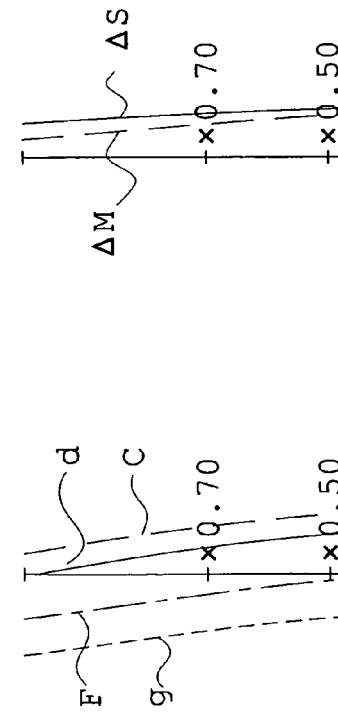
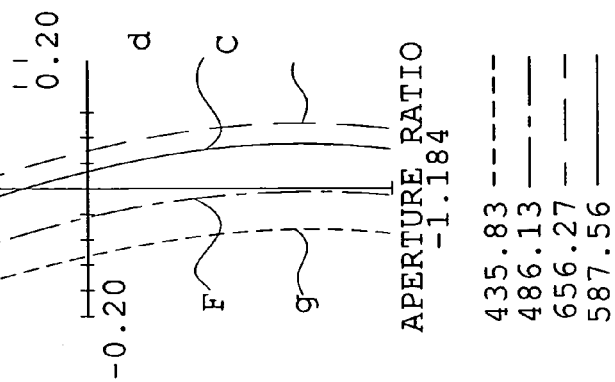
FIG.2A SPHERICAL ABERRATION
FIG.2B ASTIGMATISM
FIG.2C CHROMATIC ABERRATION OF MAGNIFICATION
FIG.2D COMA

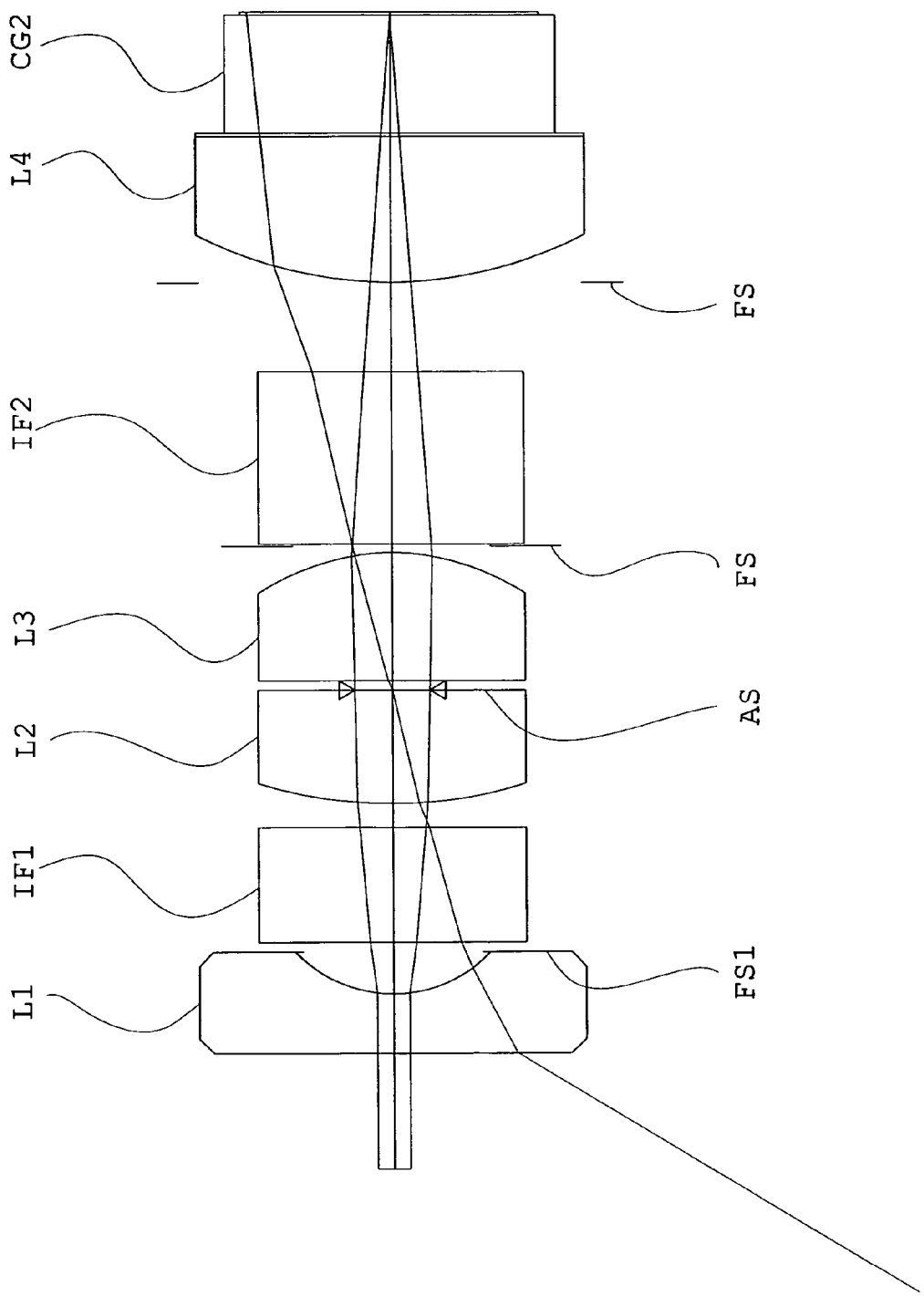

OBJECT LENS AND ENDOSCOPE USING IT

This application is a 371 national phase application of PCT/JP2004/006533 filed on 14 May 2004, claiming priority to JP 2003-137263 filed on 15 May 2003, the contents of which are incorporated herein by reference in their entirety.

TECHNICAL FIELD

The invention relates to an endoscope objective lens that has a small number of lenses and is simple in arrangement, and to an endoscope using this objective lens.

BACKGROUND ART

In an endoscope used for medical treatment, a sleek design of the insertion tube section of the endoscope and a reduction in length of a rigid portion at the distal end of the insertion tube section are demanded in order to improve its operation property. It is thus indispensable that the objective lens used in the endoscope is constructed so that aberration is completely corrected in practical use, a lens contour is small, and the entire length is reduced.

Conventional endoscope objective lenses, each having a simple arrangement of three lens elements, are set forth, for example, in Patent References 1 and 2 described below. In the former, chromatic aberration is favorably corrected although the arrangement is simple. In the latter, a compact design is executed and telecentricity is good.

Patent Reference 1: Japanese Patent Kokai No. Hei 5-107470

Patent Reference 2: Japanese Patent Kokai No. Hei 10-170821

An objective lens including four lens elements, in which a field lens is placed in the proximity of an image plane, is set forth, for example, in Patent Reference 3 described below. This objective lens has better telecentricity than in Patent References 1 and 2 and is suitable for a fiberscope, for instance.

Patent Reference 3: Japanese Patent Kokai No. Hei 2-176611

DISCLOSURE OF THE INVENTION

Problems that the Invention is to Solve

Recently, in accordance with compactness and a high density of pixels of an image sensor, an objective lens that is smaller in size and higher in performance has been required.

However, as a first problem, like the case where the image sensor of ordinary size is used, space for arranging various optical filters must be ensured inside the objective lens even in a small-sized image sensor. This needs an objective lens that has a sufficient back focus with respect to the focal length of the entire system. However, when the conventional objective lens is fractionally demagnified, space for arranging various optical filters provided inside a photographing optical system becomes insufficient. In addition, the shortage of lens edge thickness is caused and lens fabrication becomes difficult.

As a second problem, chromatic aberration of magnification must be corrected with respect to high image quality.

The objective lens of the endoscope has negative refracting power on the object side of an aperture stop and positive refracting power on the image side of the aperture stop to achieve a wide-angle design. Its arrangement is asymmetrical about the stop and correction for chromatic aberration of magnification is particularly difficult. In a lens type using a cemented lens component, the arrangement becomes complicated, and in a lens for a small-sized image sensor, the fabrication of the cemented lens component is difficult.

In the objective lens mentioned above, on the other hand, the first and second problems cannot be solved simultaneously.

For example, the objective lens of the eleventh embodiment described in Patent Reference 1 has a back focus 1.945 times the focal length. The back focus refers to an equivalent-air medium length from the image-side surface of the third lens to the position of an image focal point. However, chromatic aberration of magnification (a difference between the F line and the C line) is as much as 1.2% of the focal length at a half angle of view $\omega=50°$.

For example, in the objective lens of the first embodiment described in Patent reference 2, chromatic aberration of magnification is as little as 0.8% of the focal length at the half angle of view $\omega=50°$, but the back focus is 1.35 times as small as the focal length.

In Patent Reference 3, space for arranging optical filters is not shown clearly.

The present invention is made in view of the above problems of the prior art, and therefore it is an object of the present invention to provide an objective lens that is small in size, is suitable for an image sensor of high density of pixels, and is simple in arrangement, and an endoscope using this objective lens.

Means for Solving Problems

In order to achieve the above object, the objective lens according to the present invention at least includes, in order from the object side, a first lens with negative power, a second lens with positive power, an aperture stop, and a third lens with positive power. A lens component located on the image side of the aperture stop is constructed with a positive single lens or a plurality of positive single lenses, and the objective lens satisfies the following conditions:

$$45 < vd1 - vd2 \quad (1)$$

$$-0.6 < f1/f2 < -0.3 \quad (2)$$

where vd1 is the Abbe's number of the first lens, vd2 is the Abbe's number of the second lens, f1 is the focal length of the first lens, and f2 is the focal length of the second lens.

The objective lens according to the present invention also satisfies the following condition:

$$0 < \{1/(vd1 \times f1) + 1/(vd2 \times f2)\} \times f < 0.02 \quad (3)$$

where f is the focal length of the entire system of the objective lens.

The objective lens of the present invention at least includes, in order from the object side, a first lens with negative power, a second lens with positive power, an aperture stop, and a third lens with positive power. A lens component located on the image side of the aperture stop is constructed with a positive single lens or a plurality of positive single lenses, and the objective lens satisfies the following condition:

$$vd2 < 20 \quad (4)$$

The endoscope of the present invention uses either objective lens mentioned above.

Effect of the Invention

According to the present invention, an objective lens that is small in size, is suitable for an image sensor of high density of pixels, and is simple in arrangement, and an endoscope using this objective lens can be provided.

BRIEF DESCRIPTION OF THE DRAWINGS

FIG. 1 is a sectional view showing an optical arrangement, developed along the optical axis, of the objective optical system of the first embodiment in the present invention;

FIGS. 2A, 2B, 2C, and 2D show aberration characteristics of the objective optical system of the first embodiment;

FIG. 3 is a sectional view showing an optical arrangement, developed along the optical axis, of the objective optical system of the second embodiment in the present invention;

EXPLANATION OF REFERENCE NUMERALS AND SIGNS

Figure 4:
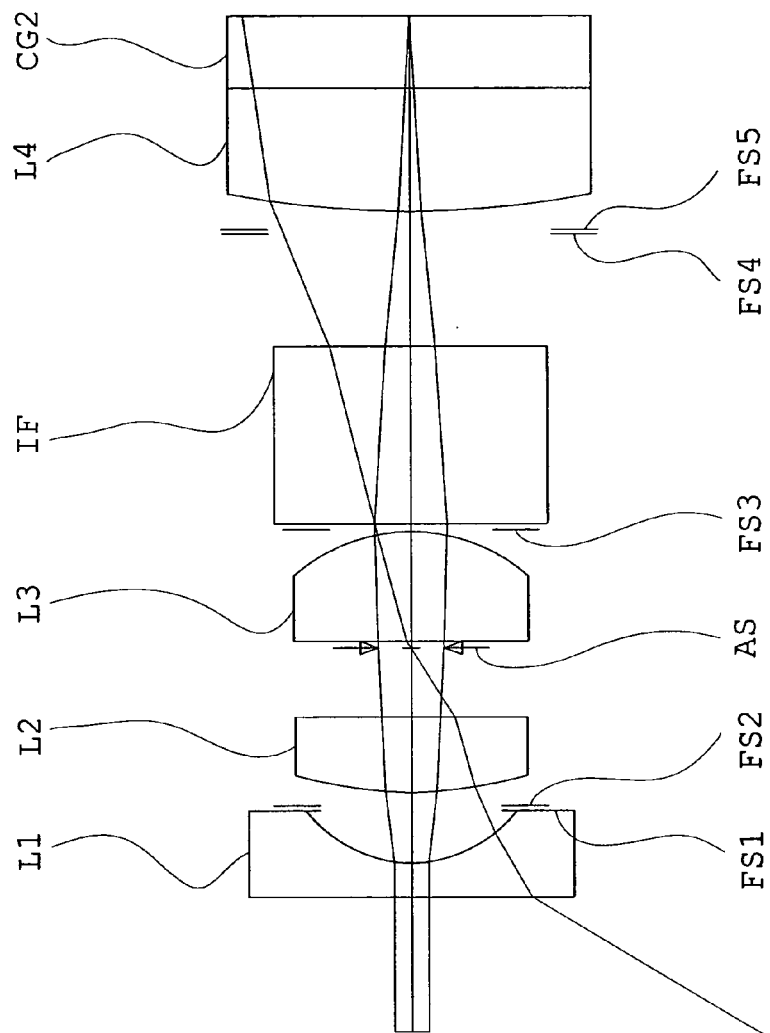
FIG. 4 is a sectional view showing an optical arrangement, developed along the optical axis, of the objective optical system of the third embodiment in the present invention.

L1 First lens (negative meniscus lens in which the object-side surface is flat and the image-side surface is concave)
L2 Second lens (plano-convex lens in which the object-side surface is convex and the image-side surface is flat)
L3 Third lens (plano-convex lens in which the object-side surface is flat and the image-side surface is convex)
L4 Fourth lens (plano-convex lens in which the object-side surface is convex and the image-side surface is flat)
FS1, FS2, FS3, and FS4 Flare stops
AS Aperture stop
IF, IF1, and IF2 Infrared cutoff filters
CG1 CCD cover glass
CG2 CCD chip sealing glass
11 Endoscope insertion tube section
11a Distal end hard portion
12 Control section
13 Joint section
14 Universal cord section
15 Lens frame
16 Illumination lens
17 Light guide.

BEST MODE FOR CARRYING OUT THE INVENTION

Before undertaking the description of the embodiments, the function and effect of the present invention will be explained.

When the lens component located on the image side of the aperture stop is constructed with only a positive single lens, chromatic aberration of magnification is undercorrected on the image side of the stop. Thus, in order to correct chromatic aberration of magnification over the entire system, it is necessary that the chromatic aberration of magnification is not undercorrected, namely overcorrected, on the object side of the stop.

Condition (1) determines the Abbe's numbers of lenses located on the object side of the stop to favorably correct chromatic aberration of magnification. Outside the limits of Condition (1), it becomes difficult to correct chromatic aberration over the entire system.

In order to ensure a sufficient back focus, it is necessary to satisfy Condition (2). Condition (2) determines the ratio between the focal lengths of the first and second lens units. Below the lower limit of Condition (2), it becomes difficult to ensure a sufficient back focus. Beyond the upper limit of Condition (2), the result is advantageous in ensuring the back focus, but the refracting power of the second lens is impaired and chromatic aberration of magnification is liable to be undercorrected.

However, when Conditions (1) and (2) are satisfied simultaneously like the present invention, correction for chromatic aberration of magnification and ensuring the back focus can be achieved.

In the present invention, in order to further favorably correct chromatic aberration of magnification, it is desirable to satisfy Condition (3) or (4).

Condition (3) signifies the amount of chromatic aberration of magnification yielded on the object side of the stop. Below the lower limit of Condition (3), chromatic aberration of magnification is liable to be undercorrected. Beyond the upper limit of Condition (3), the result is advantageous in correcting chromatic aberration of magnification, but the refracting power of the second lens is increased, which offers a disadvantage to ensuring the back focus.

Condition (4) determines the Abbe's number of the second lens. It is advantageous in correcting chromatic aberration of magnification to choose a large Abbe's number for the first lens and a small Abbe's number for the second lens. It is particularly effective to determine the Abbe's number of the second lens, and a lens less than 20 in Abbe's number is preferably used.

As a glass material with the Abbe's number less than 20, one example is cited below.

Name of glass material: S-NPH2
Abbe's number (vd): 18.9
Glass code: 923189
Manufactured by OHARA INC.

The glass material S-NPH2 is large in color dispersion and exhibits the extremely great ability to correct chromatic aberration. This material is used for the second lens and thereby becomes advantageous in correcting chromatic aberration of magnification. Since the refractive index nd of the material is as high as 1.92286, it is effective for a reduction of the Petzval sum.

The glass material used for the second lens of the present invention is not limited to S-NPH2, and any material in which the Abbe's number (vd) is less than 20 can be applied because it has the same effect on correction for chromatic aberration.

In the first lens, it is good practice to use sapphire. Sapphire is large in Abbe's number (vd=71.79) and is advantageous in correcting chromatic aberration of magnification. Further, sapphire is high in refractive index (nd=1.7682) and is advantageous in correcting coma. Still further, sapphire withstands high-temperature and -pressure vapor sterilization, called autoclave sterilization, and thus is preferably used for the first lens exposed to the exterior. The first lens, instead of being constructed of sapphire, may be constructed of an optical member that offers high resistance to high-temperature and -pressure vapor, such as synthetic quartz, transmissive YAG, or spinel. Any lens other than the first lens may be constructed of the optical member that offers high resistance to high-temperature and -pressure vapor, such as sapphire, synthetic quartz, transmissive YAG, or spinel.

In accordance with the drawings, the embodiments of the present invention will be described below.

FIRST EMBODIMENT

FIG. 1 shows an optical arrangement, developed along the optical axis, of the objective optical system of a first embodiment in the present invention. FIGS. 2A, 2B, 2C, and 2D show aberration characteristics of the objective optical system of the first embodiment.

The objective optical system of the first embodiment includes, in order from the object side, a negative meniscus lens L1 in which the object-side surface is flat and the image-side surface is concave, constructed as a first lens; flare stops FS1 and FS2; a plano-convex lens L2 in which the object-side surface is convex and the image-side surface is flat, constructed as a second lens; an aperture stop AS; a plano-convex lens L3 in which the object-side surface is flat and the image-side surface is convex, constructed as a third lens; a flare stop FS3; an infrared cutoff filter IF; a flare stop FS4; a CCD cover glass CG1; and a CCD chip sealing glass CG2. Both surfaces of the infrared cutoff filter IF have YAG and LD laser light cutoff coatings.

Also, the optical systems of all embodiments to be described later, including the first embodiment, are constructed of glass materials that do not contain lead and arsenic.

In the objective optical system of the first embodiment, sapphire is used for the first lens L1; S-NPH2 (made by OHARA INC.), for the second lens L2; S-LAH58 (by OHARA INC.), for the third lens L3; C5000 (by HOYA CO.), for the infrared cutoff filter IF; and S-BSL7 (by OHARA INC.), for the CCD cover glass CG1, as individual glass materials. The CCD chip sealing glass CG2 can also be constructed of the glass material that does not contain lead and arsenic.

Each optical member may be constructed of some glass material that possesses optical properties equivalent to the above glass material.

Subsequently, numerical data of optical members constituting the objective optical system of the first embodiment are shown below.

Also, the refractive index and the Abbe's number indicate those corresponding to the d line. They are also used for the numerical data of the embodiments to be described later.

Numerical data 1

| Face number | Radius of curvature | Face-to-face (or air) spacing | Refractive index | Abbe's number |
| --- | --- | --- | --- | --- |
| 0 (Object surface) | ∞ | 10.6744 | | |
| 1 | ∞ | 0.3389 | 1.76820 | 71.79 |
| 2 | 0.8641 | 0.3389 | | |
| 3 | ∞ | 0.0508 | | |
| 4 | ∞ | 0.4744 | | |
| 5 | 2.7262 | 1.1013 | 1.92286 | 18.90 |
| 6 | ∞ | 0 | | |
| 7 (Stop) | ∞ | 0.0508 | | |
| 8 | ∞ | 0.8472 | 1.88300 | 40.76 |
| 9 | −1.4233 | 0 | | |
| 10 | ∞ | 0.0508 | | |
| 11 | ∞ | 1.0505 | 1.51400 | 75.00 |
| 12 | ∞ | 0.3897 | | |
| 13 | ∞ | 0.0508 | | |
| 14 | ∞ | 0.6777 | 1.51633 | 64.14 |
| 15 | ∞ | 0.0169 | 1.51000 | 64.10 |
| 16 | ∞ | 0.6777 | 1.52000 | 64.10 |
| 17 | ∞ | 0 | | |
| 18 (Imaging surface) | ∞ | 0 | | |

SECOND EMBODIMENT

FIG. 3 shows an optical arrangement, developed along the optical axis, of the objective optical system of a second embodiment in the present invention.

The objective optical system of the second embodiment includes, in order from the object side, the negative meniscus lens L1 in which the object-side surface is flat and the image-side surface is concave, constructed as the first lens; the flare stop FS1; an infrared cutoff filter IF1; the piano-convex lens L2 in which the object-side surface is convex and the image-side surface is flat, constructed as the second lens; the aperture stop AS; the piano-convex lens L3 in which the object-side surface is flat and the image-side surface is convex, constructed as the third lens; the flare stop FS2; an infrared cutoff filter IF2; the flare stop FS3; a piano-convex lens L4 in which the object-side surface is convex and the image-side surface is flat, constructed as a fourth lens; and the CCD chip sealing glass CG2. Both surfaces of the infrared cutoff filter IF2 have YAG and LD laser light cutoff coatings.

The fourth lens L4 is constructed so that it is placed in the proximity of the image plane to a grazing incidence sensitive characteristic of the image sensor to play the role of a field lens that controls the position of the exit pupil of the optical system.

In the objective optical system of the second embodiment, sapphire is used for the first lens L1; S-NPH2 (by OHARA INC.), for the second lens L2; S-YGH51 (by OHARA INC.), for the third lens L3; S-BSL7 (by OHARA INC.), for the fourth lens L4; and CM5000 (by HOYA CO.), for the infrared cutoff filters IF1 and IF2, as individual glass materials. The CCD chip sealing glass CG2 can also be constructed of the glass material that does not contain lead and arsenic.

Each optical member may be constructed of some glass material that possesses optical properties equivalent to the above glass material.

Subsequently, numerical data of optical members constituting the objective optical system of the second embodiment are shown below.

Numerical data 2

| Face number | Radius of curvature | Face-to-face (or air) spacing | Refractive index | Abbe's number |
|---|---|---|---|---|
| 0 (Object surface) | ∞ | 10.1769 | | |
| 1 | ∞ | 0.3769 | 1.76820 | 71.79 |
| 2 | 0.8481 | 0.2827 | | |
| 3 | ∞ | 0.0565 | | |
| 4 | ∞ | 0.7538 | 1.49400 | 75.00 |
| 5 | ∞ | 0.1508 | | |
| 6 | 2.8684 | 0.7350 | 1.92286 | 18.90 |
| 7 | ∞ | 0 | | |
| 8 (Stop) | ∞ | 0.0565 | | |
| 9 | ∞ | 0.8292 | 1.75500 | 52.32 |
| 10 | −1.5152 | 0.0565 | | |
| 11 | ∞ | 0 | | |
| 12 | ∞ | 1.1308 | 1.49400 | 75.00 |
| 13 | ∞ | 0.5654 | | |
| 14 | ∞ | 0 | | |
| 15 | 2.6234 | 0.9423 | 1.51633 | 64.14 |
| 16 | ∞ | 0.0188 | 1.51000 | 64.14 |
| 17 | ∞ | 0.7538 | 1.61350 | 50.20 |
| 18 | ∞ | 0.0188 | 1.51000 | 64.14 |
| 19 | ∞ | 0 | | |
| 20 (Imaging surface) | ∞ | 0 | | |

Numerical data 3

| Face number | Radius of curvature | Face-to-face (or air) spacing | Refractive index | Abbe's number |
|---|---|---|---|---|
| 0 (Object surface) | ∞ | 10.0657 | | |
| 1 | ∞ | 0.2013 | 1.76820 | 71.79 |
| 2 | 0.7449 | 0.3020 | | |
| 3 | ∞ | 0.0302 | | |
| 4 | ∞ | 0.0805 | | |
| 5 | 2.5678 | 0.4228 | 1.92286 | 18.90 |
| 6 | ∞ | 0.4026 | | |
| 7 (stop) | ∞ | 0.0302 | | |
| 8 | ∞ | 0.6140 | 1.77250 | 49.60 |
| 9 | −1.0478 | 0.0201 | | |
| 10 | ∞ | 0.0302 | | |
| 11 | ∞ | 1.0066 | 1.49400 | 75.00 |
| 12 | ∞ | 0.6241 | | |
| 13 | ∞ | 0.0302 | | |
| 14 | ∞ | 0.1007 | | |
| 15 | 6.0978 | 0.6845 | 1.88300 | 40.76 |
| 16 | ∞ | 0.0101 | 1.51000 | 63.80 |
| 17 | ∞ | 0.4026 | 1.61090 | 50.20 |
| 18 | ∞ | 0 | | |
| 19 (Imaging surface) | ∞ | 0 | | |

THIRD EMBODIMENT

FIG. 4 shows an optical arrangement, developed along the optical axis, of the objective optical system of a third embodiment in the present invention.

The objective optical system of the third embodiment includes, in order from the object side, the negative meniscus lens L1 in which the object-side surface is flat and the image-side surface is concave, constructed as the first lens; the flare stops FS1 and FS2; the piano-convex lens L2 in which the object-side surface is convex and the image-side surface is flat, constructed as the second lens; the aperture stop AS; the piano-convex lens L3 in which the object-side surface is flat and the image-side surface is convex, constructed as the third lens; the flare stop FS3; the infrared cutoff filter IF; flare stops FS4 and FS5; the piano-convex lens L4 in which the object-side surface is convex and the image-side surface is flat, constructed as the fourth lens; and the CCD chip sealing glass CG2. Both surfaces of the infrared cutoff filter IF have YAG and LD laser light cutoff coatings.

The fourth lens L4 is constructed so that it is placed in the proximity of the image plane to a grazing incidence sensitive characteristic of the image sensor to play the role of a field lens that controls the position of the exit pupil of the optical system.

In the objective optical system of the third embodiment, sapphire is used for the first lens L1; S-NPH2 (by OHARA INC.), for the second lens L2; S-LAH66 (by OHARA INC.), for the third lens L3; S-LAH58 (by OHARA INC.), for the fourth lens L4; and CM5000 (by HOYA CO.), for the infrared cutoff filter IF, as individual glass materials. The CCD chip sealing glass CG2 can also be constructed of the glass material that does not contain lead and arsenic.

Each optical member may be constructed of some glass material that possesses optical properties equivalent to the above glass material.

Subsequently, numerical data of optical members constituting the objective optical system of the third embodiment are shown below.

FOURTH EMBODIMENT

Figure 5:
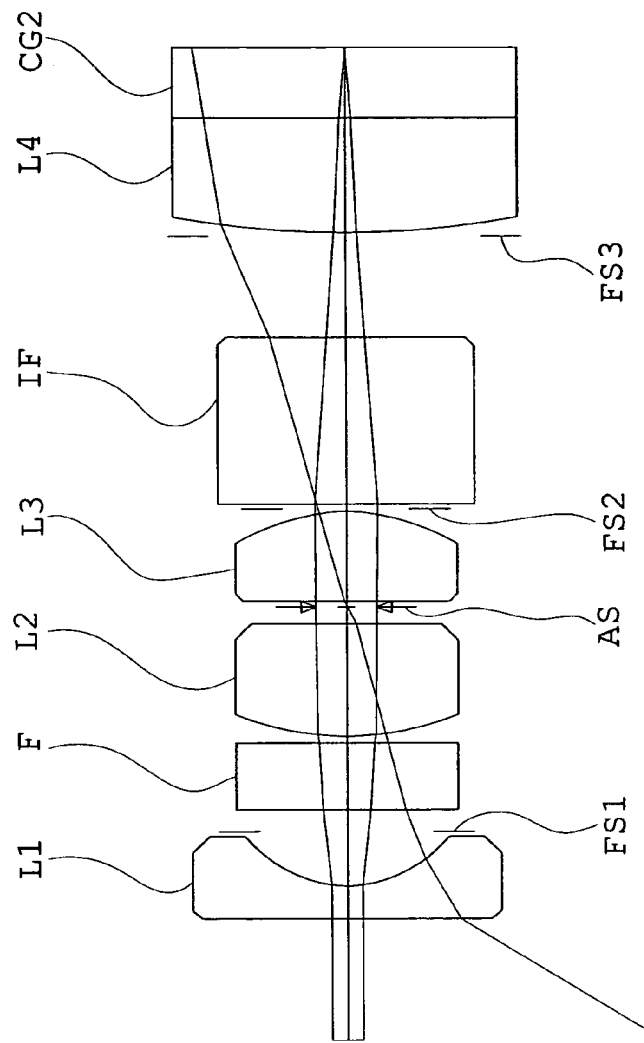
FIG. 5 is a sectional view showing an optical arrangement, developed along the optical axis, of the objective optical system of the fourth embodiment in the present invention.

FIG. 5 shows an optical arrangement, developed along the optical axis, of the objective optical system of a fourth embodiment in the present invention.

The objective optical system of the fourth embodiment includes, in order from the object side, the negative meniscus lens L1 in which the object-side surface is flat and the image-side surface is concave, constructed as the first lens; the flare stop FS1; a filter F; the piano-convex lens L2 in which the object-side surface is convex and the image-side surface is flat, constructed as the second lens; the aperture stop AS; the piano-convex lens L3 in which the object-side surface is flat and the image-side surface is convex, constructed as the third lens; the flare stop FS2; the infrared cutoff filter IF; the flare stop FS3; the piano-convex lens L4 in which the object-side surface is convex and the image-side surface is flat, constructed as the fourth lens; and the CCD chip sealing glass CG2. Both surfaces of the filter F have YAG and LD laser light cutoff coatings.

The fourth lens L4 is constructed so that it is placed in the proximity of the image plane to a grazing incidence sensitive characteristic of the image sensor to play the role of a field lens that controls the position of the exit pupil of the optical system.

In the objective optical system of the fourth embodiment, sapphire is used for the first lens L1; S-TIH53 (by OHARA INC.), for the second lens L2; S-LAL18 (by OHARA INC.), for the third lens L3; S-LAH58 (by OHARA INC.), for the fourth lens L4; B270-SUPERWITE (by SCHOTT DESAG AG), for the filter F; and CM5000 (by HOYA CO.), for the infrared cutoff filters IF, as individual glass materials. The CCD chip sealing glass CG2 can also be constructed of the glass material that does not contain lead and arsenic.

Each optical member may be constructed of some glass material that possesses optical properties equivalent to the above glass material.

Subsequently, numerical data of optical members constituting the objective optical system of the fourth embodiment are shown below.

Numerical data 4

| Face number | Radius of curvature | Face-to-face (or air) spacing | Refractive index | Abbe's number |
|---|---|---|---|---|
| 0 (Object surface) | ∞ | 9.3606 | | |
| 1 | ∞ | 0.2080 | 1.76820 | 71.79 |
| 2 | 0.7696 | 0.3432 | | |
| 3 | ∞ | 0.1352 | | |
| 4 | ∞ | 0.4160 | 1.52287 | 59.89 |
| 5 | ∞ | 0.0416 | | |
| 6 | 1.7650 | 0.7072 | 1.84666 | 23.78 |
| 7 | ∞ | 0.1040 | | |
| 8 (Stop) | ∞ | 0.0312 | | |
| 9 | ∞ | 0.5512 | 1.72916 | 54.68 |
| 10 | −1.3240 | 0.0208 | | |
| 11 | ∞ | 0.0312 | | |
| 12 | ∞ | 1.0401 | 1.49400 | 75.00 |
| 13 | ∞ | 0.6240 | | |
| 14 | ∞ | 0.0312 | | |
| 15 | 6.3007 | 0.7072 | 1.88300 | 40.76 |
| 16 | ∞ | 0.0104 | 1.56384 | 60.70 |
| 17 | ∞ | 0.4160 | 1.51100 | 64.14 |
| 18 | ∞ | 0.0088 | 1.56384 | 60.70 |
| 19 | ∞ | 0 | | |
| 20 (Imaging surface) | ∞ | 0 | | |

FIFTH EMBODIMENT

Figure 6:
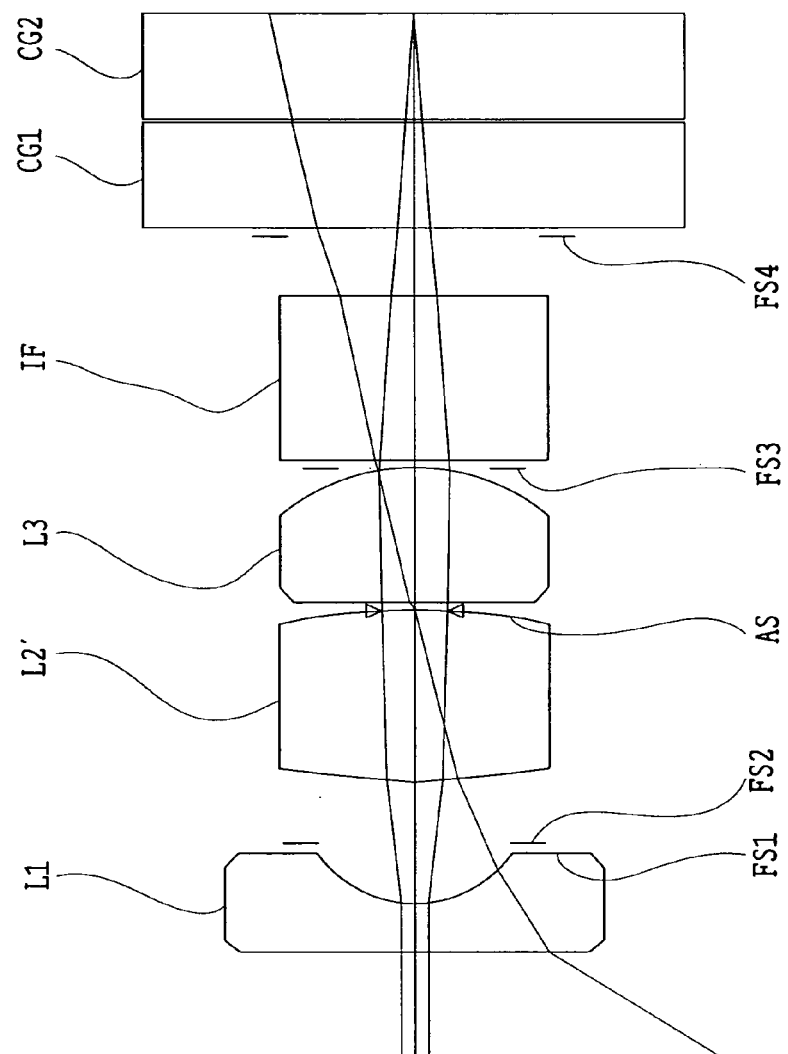
FIG. 6 is a sectional view showing an optical arrangement, developed along the optical axis, of the objective optical system of the fifth embodiment in the present invention.

FIG. 6 shows an optical arrangement, developed along the optical axis, of the objective optical system of a fifth embodiment in the present invention.

The objective optical system of the fifth embodiment includes, in order from the object side, the negative meniscus lens L1 in which the object-side surface is flat and the image-side surface is concave, constructed as the first lens; the flare stops FS1 and FS2; a biconvex lens L2' constructed as the second lens; the aperture stop AS; the plano-convex lens L3 in which the object-side surface is flat and the image-side surface is convex, constructed as the third lens; the flare stop FS3; the infrared cutoff filter IF; the flare stop FS4; the CCD cover glass CG1; and the CCD chip sealing glass CG2. Both surfaces of the infrared cutoff filter IF have YAG and LD laser light cutoff coatings.

In the objective optical system of the fifth embodiment, GFK68 (by SUMITA Optical Glass Inc.) is used for the first lens L1; S-NPH2 (by OHARA INC.), for the second lens L2'; S-LAH58 (by OHARA INC.), for the third lens L3; C5000 (by HOYA CO.), for the infrared cutoff filter IF; and S-BSL7 (by OHARA INC.), for the CCD cover glass CG1, as individual glass materials. The CCD chip sealing glass CG2 can also be constructed of the glass material that does not contain lead and arsenic.

Each optical member may be constructed of some glass material that possesses optical properties equivalent to the above glass material.

Subsequently, numerical data of optical members constituting the objective optical system of the fifth embodiment are shown below.

Numerical data 5

| Face number | Radius of curvature | Face-to-face (or air) spacing | Refractive index | Abbe's number |
|---|---|---|---|---|
| 0 (Object surface) | ∞ | 10.7814 | | |
| 1 | ∞ | 0.3082 | 1.59240 | 68.33 |
| 2 | 0.7482 | 0.3423 | | |
| 3 | ∞ | 0.0513 | | |
| 4 | ∞ | 0.4055 | | |
| 5 | 4.6335 | 1.1124 | 1.92286 | 18.90 |
| 6 | −18.7952 | 0 | | |
| 7 (Stop) | ∞ | 0.0513 | | |
| 8 | 42.1769 | 0.8557 | 1.88300 | 40.76 |
| 9 | −1.3733 | 0 | | |
| 10 | ∞ | 0.0513 | | |
| 11 | ∞ | 1.0610 | 1.51400 | 75.00 |
| 12 | ∞ | 0.3765 | | |
| 13 | ∞ | 0.0513 | | |
| 14 | ∞ | 0.6845 | 1.51633 | 64.14 |
| 15 | ∞ | 0.0171 | 1.51000 | 64.10 |
| 16 | ∞ | 0.6845 | 1.52000 | 64.10 |
| 17 | ∞ | 0 | | |
| 18 (Imaging surface) | ∞ | 0 | | |

Subsequently, the values and parameters of individual conditions and other data are listed in Tables 1–3.

TABLE 1

| Condition | First embodiment | Second embodiment | Third embodiment | Fourth embodiment | Fifth embodiment |
|---|---|---|---|---|---|
| 45 < vd1 − vd2 | 52.89 | 52.89 | 52.89 | 48.01 | 49.43 |
| −0.6 < f1/f2 < −0.3 | −0.381 | −0.355 | −0.348 | −0.481 | −0.306 |
| 0 < {1/(vd1 × f1) + 1/(vd2 × f2)} × f < 0.02 | 0.006 | 0.004 | 0.005 | 0.006 | 0.001 |
| vd2 < 20 | 18.90 | 18.90 | 18.90 | 23.78 | 18.90 |

TABLE 2

| Condition parameters | First embodiment | Second embodiment | Third embodiment | Fourth embodiment | Fifth embodiment |
|---|---|---|---|---|---|
| f | 1.000 | 1.000 | 1.000 | 1.000 | 1.000 |
| f1 | −1.125 | −1.104 | −0.970 | −1.002 | −1.263 |
| f2 | 2.956 | 3.105 | 2.783 | 2.085 | 4.122 |
| vd1 | 71.79 | 71.79 | 71.79 | 71.79 | 68.33 |

TABLE 3

| Other specifications | First embodiment | Second embodiment | Third embodiment | Fourth embodiment | Fifth embodiment |
|---|---|---|---|---|---|
| F-number | 4.604 | 4.153 | 4.623 | 5.023 | 4.484 |
| Image height | 0.898 | 0.901 | 0.917 | 0.927 | 0.907 |
| Total angle of view | 115.4 | 116.3 | 117.5 | 116.7 | 115.7 |
| Object distance | 10.6744 | 10.1769 | 10.0657 | 9.3606 | 10.7814 |
| Chromatic aberration of magnification at maximum angle of view | 0.006 | 0.009 | 0.006 | 0.005 | 0.009 |
| Back focus | 2.080 | 2.758 | 2.126 | 2.092 | 2.073 |
| First lens medium | Sapphire | Sapphire | Sapphire | Sapphire | GFK68 |
| Second lens medium | S-NPH2 | S-NPH2 | S-NPH2 | S-TIH53 | S-NPH2 |

As will be obvious from Table 3, the objective lenses of individual embodiments have half angles of view co of 57.7° (the first embodiment), 58.2° (the second embodiment), 58.8° (the third embodiment), 58.4° (the fourth embodiment), and 57.9° (the fifth embodiment) (2ω=115.4°, 116.3°, 117.5°, 116.7°, and 115.7°). Although they are more than 50° in all cases, chromatic aberrations of magnification are 0.6% (the first embodiment), 0.9% (the second embodiment), 0.6% (the third embodiment), 0.5% (the fourth embodiment), and 0.9% (the fifth embodiment) of the focal lengths and are favorably corrected.

The back focus of each of the first and fifth embodiments, as already defined, refers to the equivalent-air medium length from the image-side surface of the third lens to the position of the image focal point.

Because the fourth lens constructed as the field lens is placed, the back focus of each of the second to fourth embodiments is defined as follows.

In the optical system ranging from the first lens to the third lens, other than the fourth lens, the back focus refers to the equivalent-air medium length from the image-side surface of the third lens to the position of an image focal point.

As will be obvious from Table 3, the objective lenses of individual embodiments ensure the back focuses 2.08 times (the first embodiment), 2.758 times (the second embodiment), 2.126 times (the third embodiment), 2.092 times (the fourth embodiment), and 2.073 time the focal lengths.

Figure 7A:
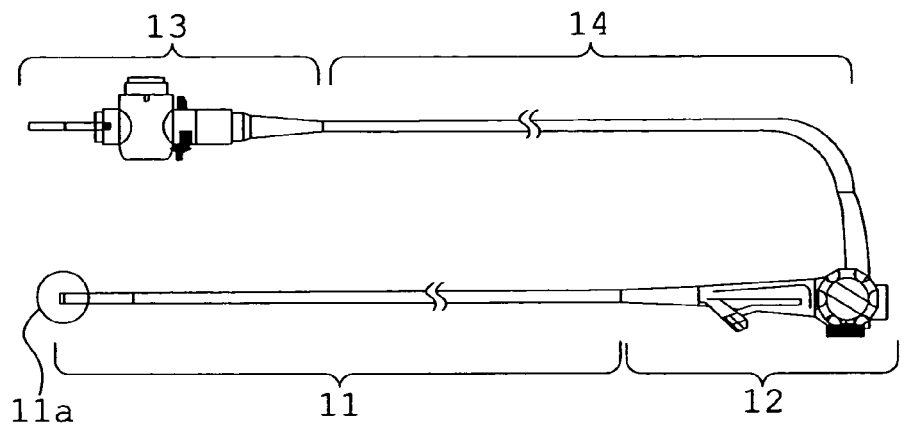
FIG. 7A is a general view showing one embodiment of an endoscope using the objective lens of the present invention.
Figure 7B:
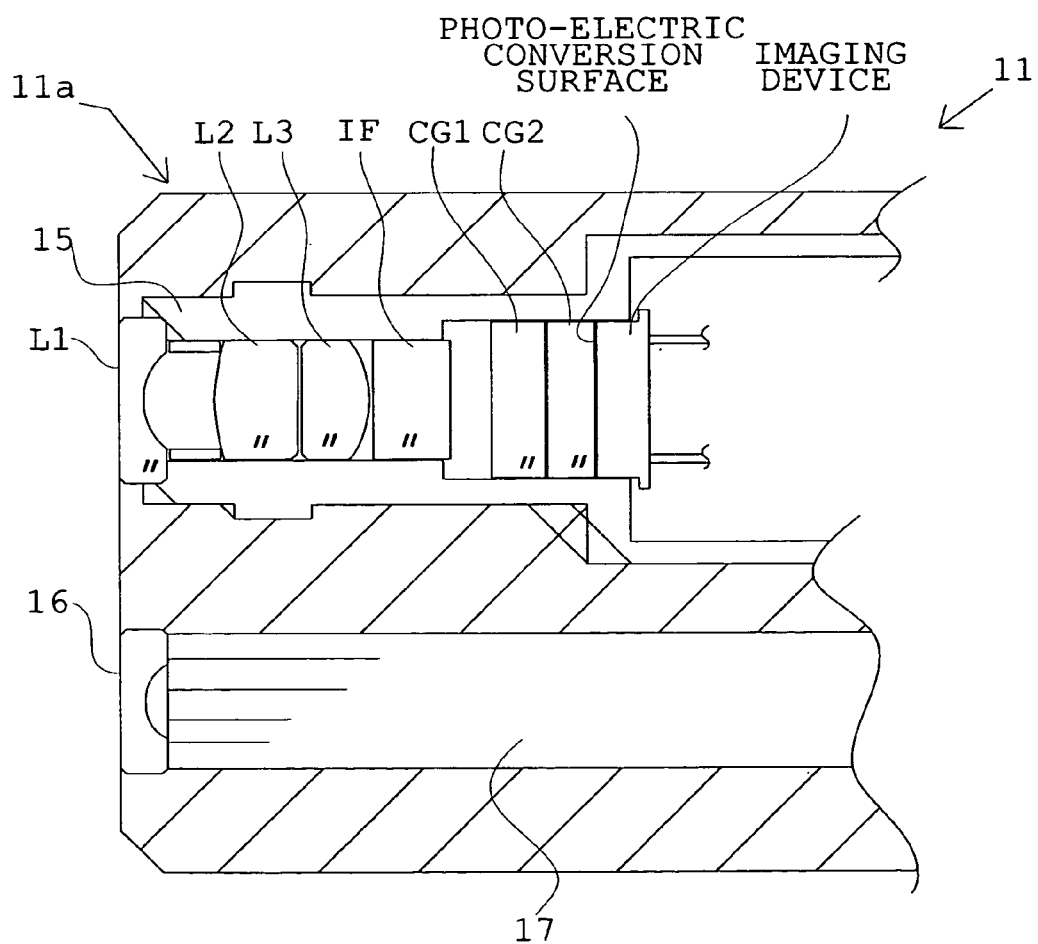
FIG. 7B is an enlarged sectional view showing essential parts of the endoscope of FIG. 7A.

Although the embodiments of the objective lens of the present invention have been described above, an endoscope can be designed by using the objective lens of the present invention. FIGS. 7A and 7B illustrate one embodiment of an endoscope using the objective lens of the present invention.

The endoscope of this embodiment has an insertion tube section 11 provided with the objective optical system of the present invention, a control section 12 for operating the insertion tube section 11, a joint section 13 for connecting an image display device and a light source, not shown, and a flexible universal cord section 14 connecting the control section 12 with the joint section 13.

The distal end of the insertion tube section 11 is constructed as a hard portion 11a of rigidity. Inside the hard portion 11a, as illustrated in FIG. 7B, the objective lens of any of the embodiments is provided in a lens frame 15. Further, inside the hard portion 11a, an illumination lens 16 and a light guide 17 are encased.

According to the endoscope of the embodiment, since the objective lens of the present invention that is suitable for a small-sized image sensor with a high density of pixels and has a simple arrangement is used, the sleek design of the insertion tube section 11 is further achieved and the length of the hard portion 11a at the distal end can be reduced.

Other constructions, functions, and effects of conventional endoscopes are the same as in the endoscope of the embodiment.

The invention claimed is:

1. An objective lens comprising, in order from an object side:
    a first lens with negative power;
    a second lens with positive power;
    an aperture stop; and
    a third lens with positive power,
    a lens component located on the image side of the aperture stop being constructed with a positive single lens or a plurality of positive single lenses,
    the objective lens satisfying the following conditions:

$45 < vd1 - vd2$ $-0.6 < f1/f2 < -0.3$ where vd1 is an Abbe's number of the first lens, vd2 is an Abbe's number of the second lens, f1 is a focal length of the first lens, and f2 is a focal length of the second lens.

2. An objective lens according to claim 1, satisfying the following condition:

$0 < \{1/(vd1 \times f1) + 1/(vd2 \times f2)\} \times f < 0.02$ where f is a focal length of an entire system of the objective lens.

3. An endoscope using an objective lens, the objective lens comprising, in order from an object side:
    a first lens with negative power;
    a second lens with positive power;
    an aperture stop; and
    a third lens with positive power,
    a lens component located on the image side of the aperture stop being constructed with a positive single lens or a plurality of positive single lenses,
    the objective lens satisfying the following conditions:

$45 < vd1 - vd2$ $-0.6 < f1/f2 < -0.3$ where vd1 is an Abbe's number of the first lens, vd2 is an Abbe's number of the second lens, f1 is a focal length of the first lens, and f2 is a focal length of the second lens.

4. An objective lens according to claim 1, wherein the first lens is constructed of sapphire.

5. An objective lens according to claim 1, wherein said lenses are constructed of material excluding optically unfavorable substances, such as lead and arsenic.

6. An objective lens according to claim 1, satisfying the following condition:

$vd2 < 20$ where vd2 is an Abbe's number of the second lens.

7. An endoscope using an objective lens, the objective lens comprising, in order from an object side:
   a first lens with negative power;
   a second lens with positive power;
   an aperture stop; and
   a third lens with positive power,
   a lens component located on the image side of the aperture stop being constructed with a positive single lens or a plurality of positive single lenses,
   the objective lens satisfying the following conditions:
   $vd2<20$ where vd2 is an Abbe's number of the second lens.

8. An objective lens according to claim 6, wherein the first lens is constructed of sapphire.

9. An objective lens according to claim 6, wherein said lenses are constructed of material excluding optically unfavorable substances, such as lead and arsenic.

10. An objective lens comprising, in order from an object side:
    a first lens with negative power;
    a second lens with positive power;
    an aperture stop; and
    a third lens with positive power,
    the objective lens satisfying the following conditions:

$45<vd1-vd2$ $-0.6<f1/f2<-0.3$ $0<\{1/(vd1\times f1)+1/(vd2\times f2)\}\times f<0.02$ where vd1 is an Abbe's number of the first lens, vd2 is an Abbe's number of the second lens, f1 is a focal length of the first lens, f2 is a focal length of the second lens, and f is a focal length of an entire system of the objective lens.

11. An objective lens according to claim 10, satisfying the following condition $vd2<20$.

12. An endoscope using an objective lens, the objective lens comprising, in order from an object side:
    a first lens with negative power;
    a second lens with positive power;
    an aperture stop; and
    a third lens with positive power,
    the objective lens satisfying the following conditions:

$45<vd1-vd2$ $-0.6<f1/f2<-0.3$ $0<\{1/(vd1\times f1)+1/(vd2\times f2)\}\times f<0.02$ where vd1 is an Abbe's number of the first lens, vd2 is an Abbe's number of the second lens, f1 is a focal length of the first lens, f2 is a focal length of the second lens, and f is a focal length of an entire system of the objective lens.

13. An objective lens according to claim 10, wherein the first lens is constructed of sapphire.

14. An objective lens according to claim 10, wherein said lenses are constructed of material excluding optically unfavorable substances, such as lead and arsenic.

15. An objective lens comprising, in order from an object side:
    a first lens with negative power;
    a second lens with positive power;
    an aperture stop;
    a third lens with positive power; and
    a fourth lens with positive power, placed in the proximity of an image plane,
    the objective lens satisfying the following conditions:

$45<vd1-vd2$ $-0.6<f1/f2<-0.3$ $0<\{1/(vd1\times f1)+1/(vd2\times f2)\}\times f<0.02$ where vd1 is an Abbe's number of the first lens, vd2 is an Abbe's number of the second lens, f1 is a focal length of the first lens, f2 is a focal length of the second lens, and f is a focal length of an entire system of the objective lens.

16. An objective lens according to claim 15, satisfying the following condition $vd2<20$.

17. An endoscope using an objective lens, the objective lens comprising, in order from an object side:
    a first lens with negative power;
    a second lens with positive power;
    an aperture stop;
    a third lens with positive power; and
    a fourth lens with positive power, placed in the proximity of an image plane,
    the objective lens satisfying the following conditions:

$45<vd1-vd2$ $-0.6<f1/f2<-0.3$ $0<\{1/(vd1\times f1)+1/(vd2\times f2)\}\times f<0.02$ where vd1 is an Abbe's number of the first lens, vd2 is an Abbe's number of the second lens, f1 is a focal length of the first lens, f2 is a focal length of the second lens, and f is a focal length of an entire system of the objective lens.

18. An objective lens according to claim 15, wherein the first lens is constructed of sapphire.

19. An objective lens according to claim 15, wherein said lenses are constructed of material excluding optically unfavorable substances, such as lead and arsenic.

* * * * *